July 8, 1952 G. M. HARRY 2,602,340
VARIABLE SPEED REDUCER
Filed Feb. 25, 1949 5 Sheets-Sheet 2

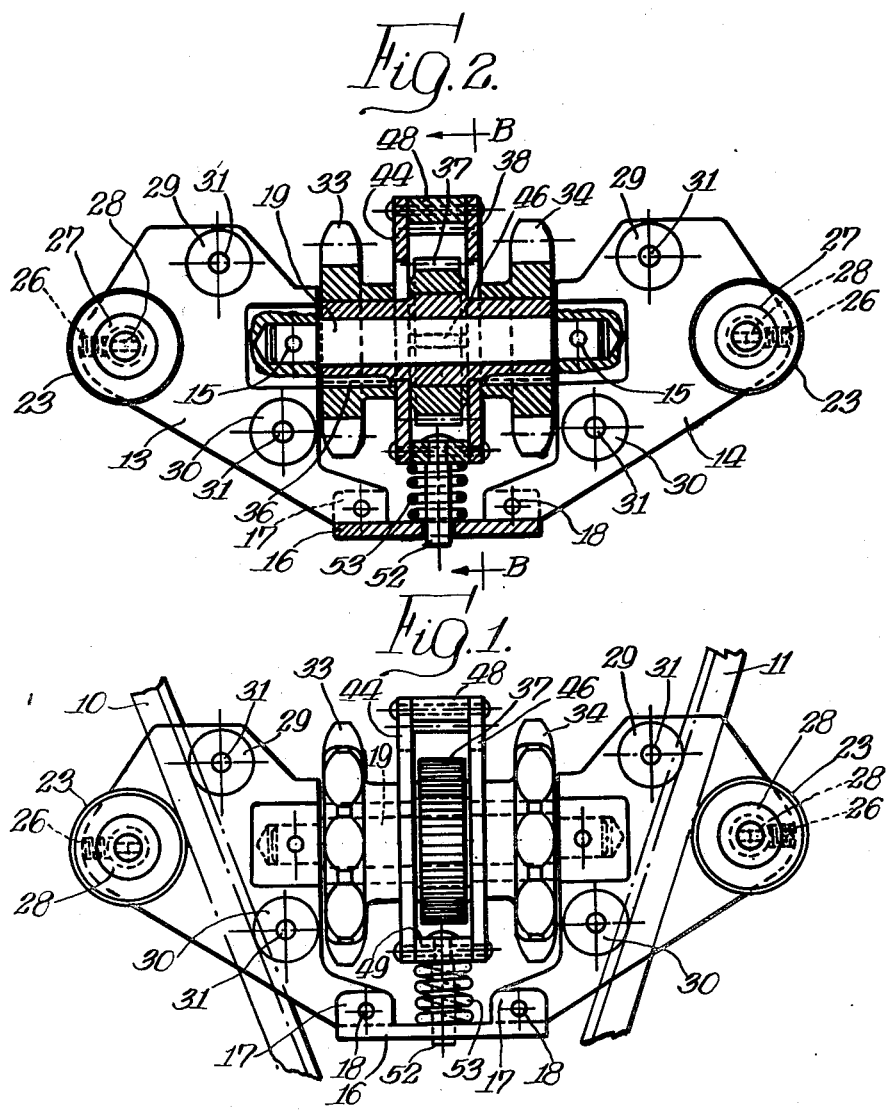

INVENTOR.
Geoffrey M. Harry
BY
Davis, Lindsey, Hibben + Noyes
Atty's.

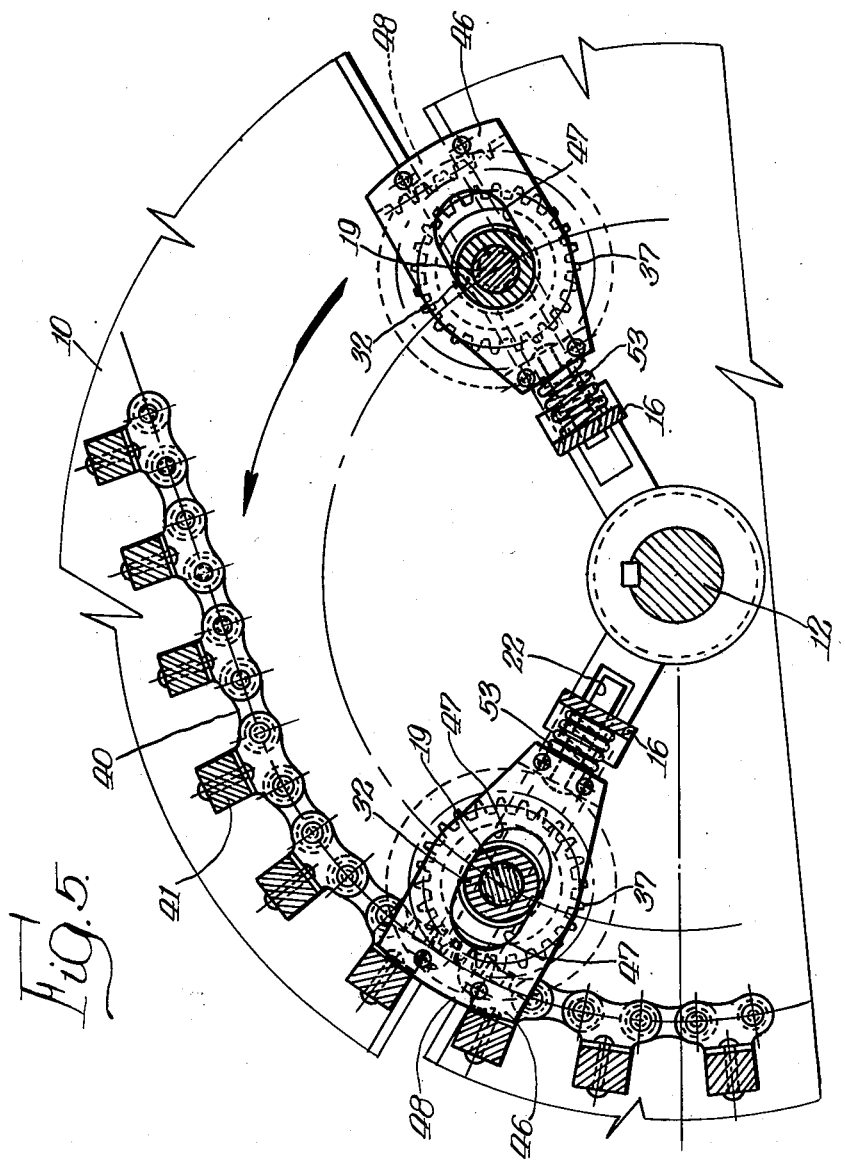

July 8, 1952

G. M. HARRY 2,602,340

VARIABLE SPEED REDUCER

Filed Feb. 25, 1949

INVENTOR.
Geoffrey M. Harry,
BY
Davis, Lindsey, Hibben + Noyes
Att'ys

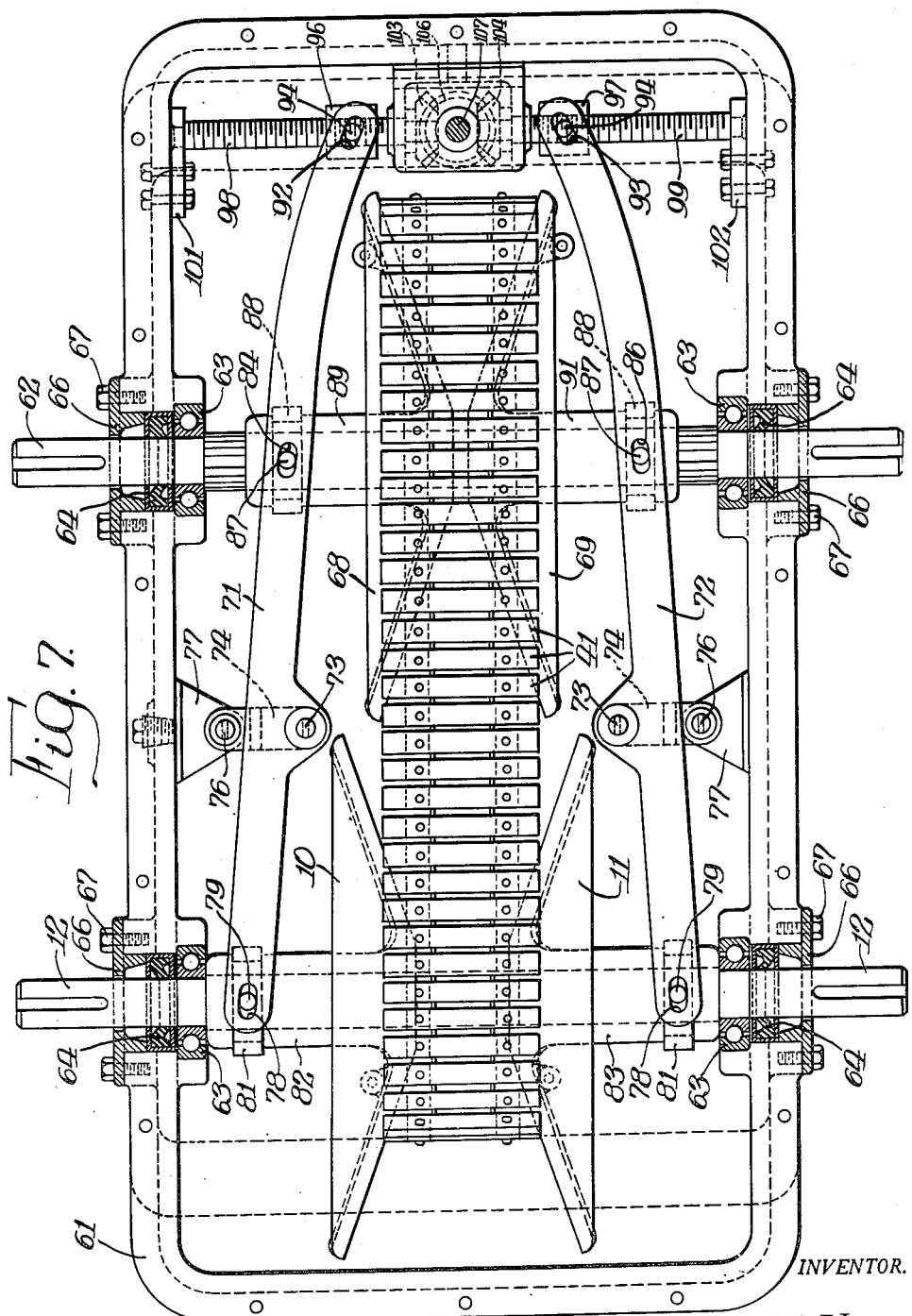

Patented July 8, 1952

2,602,340

UNITED STATES PATENT OFFICE 2,602,340

VARIABLE SPEED REDUCER

Geoffrey M. Harry, Oak Park, Ill.

Application February 25, 1949, Serial No. 78,426

17 Claims. (Cl. 74—217)

This invention relates to a variable speed transmission and more particularly to a positive drive speed transmission that is infinitely variable within a predetermined range and may be utilized for increasing or decreasing the speed of a driving unit for transmission to a driven unit. The present invention constitutes an improvement over the infinitely variable speed transmission described in my recently issued United States Letters Patent No. 2,455,483, dated December 7, 1948, the present improvement having to do primarily with the sprocket units which are movable relatively to the driving and driven conical discs as the speed of rotation is varied and which are adapted to engage the chains in driving and driven relationship.

It is, therefore, an object of the present invention to provide an improved form variable speed transmission that is positive in operation and infinitely variable.

Another object is to provide a variable speed transmission of the type comprising adjustable conical discs and a chain and sprocket drive in which the sprockets are arranged in pairs on a common rotatable supporting means and are adapted to be locked together against rotation for driving or driven engagement with the driving chain.

Still another object is to provide an improved driving or driven sprocket unit or assembly for a variable speed transmission of the foregoing character in which the plurality of sprockets are supported on a common rotatable supporting means and are adapted to be locked together against rotation for driving or driven engagement with the driving chain.

A further object is to provide a sprocket unit of the character described in the preceding object and comprising a locking means adapted to prevent rotation of the rotatable supporting means when said sprockets are in driving or driven engagement with the chain.

Another further object is to provide a sprocket unit of the foregoing character in which the sprockets are freely rotatable and self-adjusting relative to the chain prior to full driven and driving engagement therewith and during movement to meshing engagement therewith, and in which there is provided a locking means engageable with the chain and movable thereby into locking engagement with the sprocket supporting means.

A still further object is to provide a sprocket unit for a variable speed transmission of the foregoing character in which a movable locking means for locking a sprocket against rotation when in driving or driven meshed engagement with the driving chain, is movable to locking position upon engagement with the driving chain.

Another object is to provide a sprocket unit of the foregoing character comprising a plurality of sprockets fixedly mounted on a single rotatable shaft and a locking means to prevent rotation of the shaft when in driving or driven engagement with the driving chains.

Other and further objects of the present invention will become apparent hereinafter as this description progresses, reference being had to the accompanying drawings, in which:

Figure 1 is a side elevational view of the sprocket unit or assembly mounted in operable position on a pair of conical discs which may be either the driving or the driven discs and which are shown broken away.

Fig. 2 is a partial, vertical sectional view taken on the line A—A in Fig. 4, the supporting members not being shown in section.

Fig. 5 is a fragmentary and partial sectional view illustrating the relative positions of the sprocket assemblies and parts thereof prior to and at the time of engagement with the chain;

Figure 6:
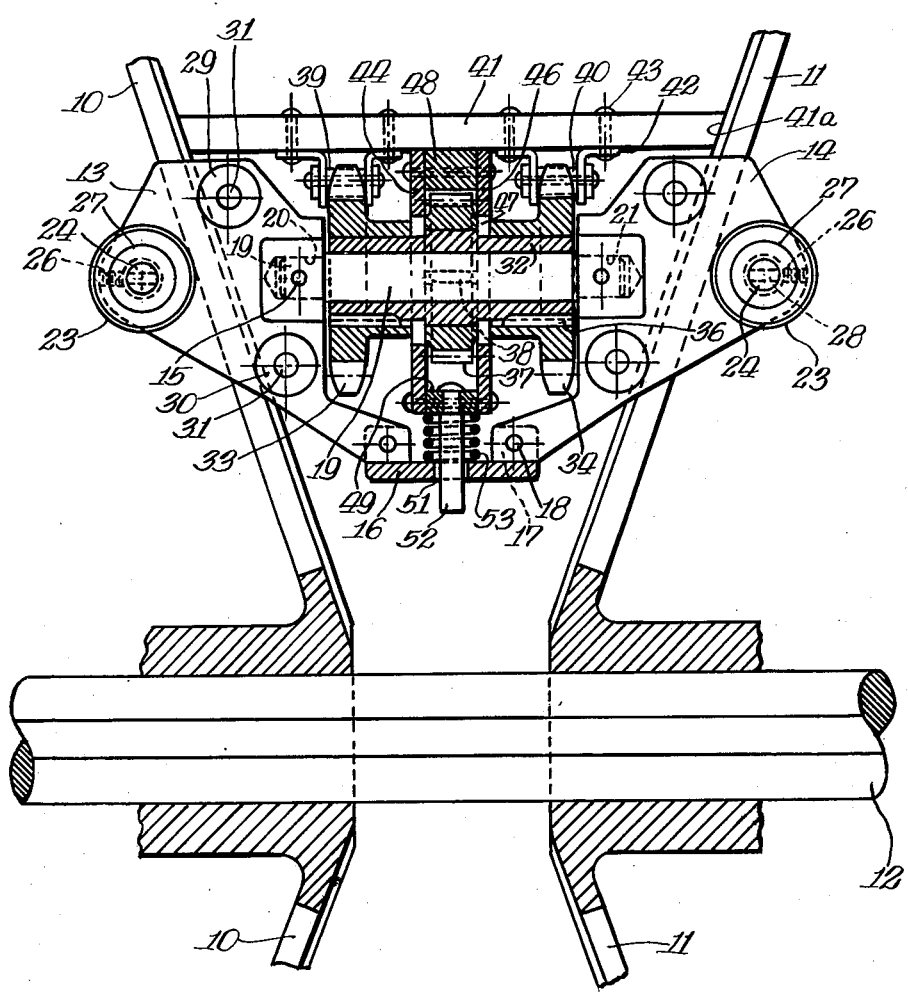

Fig. 6 is a partial, vertical sectional view of a sprocket assembly comprising the present invention and showing the plurality of sprockets on a single shaft locked against rotation by the locking means and in driving engagement with the driving chains; and Fig. 7 is a top plan view of one specific form of an infinitely variable positive drive speed transmission embodying the sprocket assembly of the present invention, the upper half of the casing of the device being removed to show the internal construction.

The sprocket assembly or unit comprising the present invention and illustrated as a preferred embodiment in the accompanying drawings, is adapted to be incorporated in plurality in an infinitely variable speed transmission of the type disclosed in my abovementioned Patent No. 2,455,483 and, in fact, is interchangeable with and may replace the sprocket assemblies there shown. It is, therefore, to be understood that for the purposes of the present disclosure reference to my said patent should be made for a full and complete description of the details of structure and mode of operation of the complete transmission.

In general, the variable speed transmission of my said patent comprises a driving shaft and a driven shaft on which are mounted for adjustable movement pairs of driving and driven conical discs having inclined faces and radial slots in and on which sprocket assemblies are mounted. The sprocket assemblies rotate with the conical discs and comprise sprockets engageable and disengageable with the driving chains so that driving torque can be transmitted from the driving shaft to the driven shaft. Relative movement of the driving shaft is transmitted to the chains through the conical discs and the sprocket assemblies and to the drive shaft through the chains, the sprocket assemblies and the conical discs on the driven shaft. When it is desired to vary the speed of the transmission, the individual members of the pairs of conical discs are moved toward or away from each other on the driving or driven shafts, thus causing the sprocket assemblies to move toward or away from the shaft to decrease or increase the driving or driven diameter of the chains. When the discs in one shaft are moved toward each other, the discs on the other shaft are moved away from each other a corresponding distance. The above generally described mechanism is clearly described and shown in my said Patent No. 2,455,483 and the sprocket assembly comprising the present invention are applicable thereto.

As shown in Figs. 1, 5 and 6 of the drawings the sprocket assembly comprising the present invention is shown mounted between the inclined faces of a pair of conical discs 10 and 11 which are mounted on a rotatable shaft 12 for rotation therewith but adapted for longitudinal movement therealong for varying the speed of the driving torque. The rotatable shaft 12 and the conical discs 10 and 11 may be either the driving or the driven shaft and discs, inasmuch as the sprocket assembly comprising the present invention may be employed at either or both of the driving or driven ends of the transmission with no changes in structure and with the same mode of operation.

Specifically, the sprocket assembly of the present invention comprises two aligned supporting, plate members or housings 13 and 14 secured together at their lower portions by a flat tie bar 16, the tie bar 16 having upstanding lugs 17 to which the housings 13 are fastened by rivets 18. At their upper portions the housing members 13 and 14 are secured together and maintained in properly spaced relationship by a cross shaft 19 fixed in opposed bores 20 and 21 in the opposed faces of the housings 10 and 11 by cross pins 15. The outer ends of the housing plates 13 and 14 extend through and beyond the conical discs 10 and 11, there being three radial slots 22 in each disc which are approximately 120° apart and in alignment and in each of which there is movably mounted a sprocket assembly.

On the outer end portions of the housing plates 13 and 14 are pairs of rollers 23 rotatably mounted on the respective ends of short fixed shafts 24 extending through the housing plates and fixed in position by retaining screws 26. The rollers 23 are held on the shafts 24 by means of washers 27 and cotter pins 28 and are adapted to engage the outer faces of the conical discs 10 and 11. The housings 13 and 14 also are provided with small, spaced rollers 29 and 30 rotatably supported on pins 31 secured in and extending through the housings inwardly of the rollers 23 and having their outer ends riveted over slightly to retain the rollers in position. These latter sets of rollers 29 and 30 are adapted to engage the inclined inner surfaces of the conical discs 10 and 11. Thus, when the discs 10 and 11 are moved toward or away from each other for speed adjustment, the outer rollers 23 and inner rollers 29 and 30 roll against the outer and inner disc faces, respectively, on opposite sides of the slots 22 so that the sprocket assemblies will freely move upwardly and downwardly in ready response to longitudinal movement of the discs 10 and 11.

A hollow shaft or sleeve 32 is supported on the fixed shaft 19 for free rotative movement relative thereto between the side housings 13 and 14. On the respective outer end portions of the rotatable sleeve 32 there are mounted in spaced relation for rotation therewith and under the control thereof a pair of sprockets 33 and 34, the driving connection between the sprockets and the sleeve 32 being through keys 36. The central portion of the sleeve 32 is of enlarged diameter and has a gear 37 keyed thereto as indicated by the reference numeral 38. Thus, the sprockets 33 and 34, the gear 37 and the sleeve 32 are secured as a unit and rotate together or remain stationary together as will be more fully explained hereinafter.

The sprockets 33 and 34 are adapted to engage and to disengage from endless roller chains 39 and 40 secured in parallel and properly spaced relationship to a plurality of supporting cross bars 41 by connecting lugs 42 and rivets 43. The chain supporting bars 41, as shown in Figs. 5 and 6, may be of square cross section and their respective end faces 41a may be beveled to conform to and evenly bear against the inclined inner faces of the conical discs 10 and 11. By the foregoing construction, as the conical discs 10 and 11 are moved with respect to each other during speed adjustment, along the shaft 12, their inner inclined faces bear against the beveled faces 41a of the chain bars 41 and against the housing rollers 23, 29 and 30, the chains and sprocket assemblies thereby being moved upwardly and downwardly relative to the shaft 12 to always maintain a constant driving engagement. In other words, when the sprocket assemblies move downwardly as the discs 10 and 11 are separated to a greater extent, the chains 39 and 40 likewise move downwardly simultaneously so as to remain in engagement.

In order to prevent rotation of the sprockets 33 and 34 during complete meshed engagement with the chains 39 and 40, there is provided a locking means whereby rotation of the sleeve 32 is prevented when the sprockets and chains have become fully meshed. This locking means comprises a pair of spaced, aligned plates 44 and 46 slidably mounted on the central portion of the sleeve 32 between the sprockets 33 and 34 and on each side of the gear 37 for vertical movement relative thereto. The plates 44 and 46 are each provided with vertical elongated slots 47 through which the sleeve 32 extends and which permit vertical movement of the plates 44 and 46 relative to the sleeve. A gear rack 48 is riveted between and to the upper inner faces of the plates 44 and 46, the teeth of the rack 48 being directed downwardly for engagement with the gear 37, and at their lower ends the plates 44 and 46 are also rigidly secured together by a cross bar 49 riveted thereto.

The bottom cross bar 49 of the locking means has a central opening 50 in alignment with an opening 51 of the housing cross plate 16, and in the bar opening 50 there is fixedly secured a vertical guide pin 52 extending downwardly through the opening 51 of the cross plate 16. A spring 53 encircles the guide pin 52 and is confined between the lower surface of the cross bar 49 and the cross plate 16, the spring serving to urge the plates 44 and 46 and the gear rack 48 upwardly to the non-locking position shown in Figs. 1 and 2. When the gear rack 48 is in its upper position so that the gear teeth thereof are out of meshing engagement with the gear 37, the sprockets 33 and 34, the gear 37 and the sleeve 32 are free to rotate as a unit on the cross shaft 19. However, when the gear rack 48 on the locking means is forced downwardly into meshing engagement with the gear 37, the gear 37, the sleeve 32 and consequently the sprockets 33 and 34 will be locked as a unit against rotation and when so locked, the sprockets 33 and 34 will positively drive or be driven by the chains 39 and 40.

The sprockets 33 and 34 rotate with the conical discs 10 and 11 and hence engage the disengage the chains 39 and 40 every revolution of the discs. At least one pair of sprockets of the three sprocket assemblies for each pair of conical discs is in driving or driven engagement with the chains 39 and 40 at all times and it is only during that period of engagement with the chains that the sprockets 33 and 34 must be locked against rotation so as to transmit the driving force. The locking means is made effective in a manner now to be described at substantially the same instant the sprockets 33 and 34 become fully meshed with the chains 39 and 40. The upper end faces of the vertical slidable side plates 44 and 46 of the locking means are rounded so as to be of lesser height at their sides, and the gear rack 48 is also rounded, and as the particular sprocket assembly of which they form a part is rotated, as shown in Fig. 5, the plates and rack become engaged with the under surfaces of the chain bars 41 prior to complete meshing engagement of the sprockets 33 and 34 with the chains. The upper ends of the plates 44 and 46 and gear rack 48 extend a considerable distance above the sprockets 33 and 34 so that upon continued rotation of the discs 10 and 11 and, as the sprockets 33 and 34 gradually pass into full meshed engagement with the chains, the plates 44 and 46 will be forced gradually downwardly by the chain bars until the gear rack 48 meshes with the sleeve gear 37. When the gear rack 48 and gear 37 are fully meshed the sprockets 33 and 34 will also be fully meshed with the chains 39 and 40, and thereafter the sprockets will be held against rotation and will transmit driving force to or from the chains.

It is to be noted, however, that the gear rack 48 is spaced a predetermined distance above the gear 37 so that it will mesh at the desired point of time. It is not spaced too high above the gear 37 so that locking of the sprockets will occur after the point where the sprockets must be in fixed driving engagement. Nor is the gear rack 48 spaced too close to the gear 37 so as to lock the sprockets before they have had an opportunity to adjust themselves relative to the chains 39 and 40 when speed adjustment is made.

Figure 4:
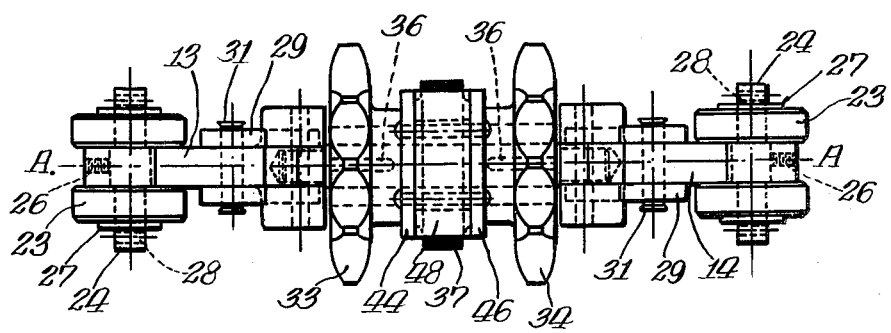
Fig. 4 is a top plan view of the sprocket assembly shown in the foregoing figures.
Figure 3:
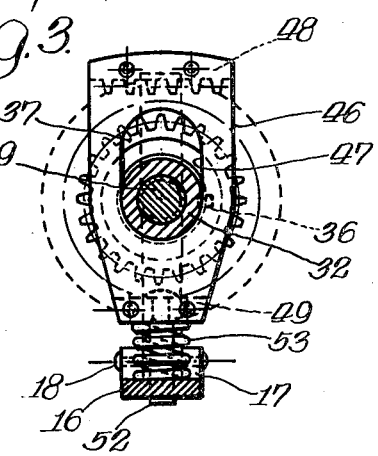
Fig. 3 is a vertical, sectional view taken on the line B—B of 2, looking in the direction of the arrows.

When the speeds of the transmission are being changed by adjustment of the conical discs 10 and 11 along the shafts 12, the roller chains 39 and 40 are forced to seek new meshing positions with the teeth of the sprockets 33 and 34 inasmuch as new driving and driven diameters are being established. As this change occurs, the top ends of the sprocket teeth engage the roller chains 39 and 40 and thereby begin rotation to proper meshing position, the sprockets 33 and 34 rotating as a unit. An instant later, the upper surfaces of the gear rack 48 and the side plates 44 and 46 of the locking means will engage the under surfaces of the chain bars 41 and start downwardly as rotation continues. During the short interval of time that the gear rack 48 is moving down into sprocket locking position, the sprockets 33 and 34 are in the process of being rotated into correct position, and this process of self-adjustment is completed at substantially the same instant that the gear rack 48 meshes with and locks the gear 37 against rotation. The relative locked position of the parts is shown in Fig. 6 and in the left sprocket assembly in Fig. 5 of the drawings. In the right position of Fig. 5 of the drawings and in Figs. 1 to 3, inclusive the locking means is shown in normal, non-locking position.

It is to be noted, however, that after a definite desired speed has been obtained and the initial meshing adjustment of the chains and sprockets has taken place, further self-adjustment is unnecessary since the chains and sprockets tend to remain in proper position without relative displacement for all further revolutions of the machine at that speed. It is only while changing machine speeds that a proper meshing position between sprocket chain and teeth is sought.

After a sprocket assembly rotates through its arc of driving engagement with the chains 39 and 40, the sprockets break off engagement with the chains and pressure against the gear rack 48 is removed, with the result that the spring 53 returns the locking means upwardly to normal position and the gear rack 48 and gear 37 become disengaged. However, before driving engagement of one sprocket assembly with the chains is broken off, the next succeeding sprocket assembly rotates into engagement therewith so that no slippage occurs. It is thus apparent that the sprocket assemblies comprising the present invention are of simple inexpensive construction, but at the same time they afford highly efficient variable speed transmissions which are infinitely variable within a specified range and are positive in drive without slippage. The transmission is thus smooth in operation and subject to minimum wear thereby reducing operating and maintenance costs.

For the sake of completeness, there is shown in Fig. 7 a plan view of a complete speed transmission or speed changer of the type illustrated in my prior patent and adapted to utilize the sprocket assembly of the present invention in combination therewith. The device is mounted for operation in an oil bath contained within a suitable casing comprising upper and lower sections adapted to be bolted together. In Fig. 7 the upper half of the casing has been removed and only the lower half thereof, indicated at 61, is shown.

Extending transversely through the casing and projecting outwardly on each side thereof are the rotatable shaft 12 and a similar shaft 62, the axes of the shafts being parallel and in the same horizontal plane. As hereinbefore pointed out, the structure and operation of the speed transmission or speed changer is such that either the shaft 12 or the shaft 62 may be the driven or the driving shaft depending upon which is connected to the prime mover (not shown) and which is connected to the machine to be driven (not shown), the operation being exactly the same in either instance. On each side of the casing, the shafts 12 and 62 are journalled in ball bearings 63 secured in the shaft openings of the casing, and outwardly of the bearings 63 are suitable oil seals 64 encircling the shafts 12 and 62 and retained in place by means of closure plates 66 and screws 67.

Each of the shafts 12 and 62 have mounted thereon for rotative movement therewith a pair of conical discs which are slidable inwardly toward each other or outwardly away from each other. As previously described, the discs 10 and 11 are carried on the shaft 12, and a similar pair of discs 68 and 69 are carried on the shaft 62, it being understood that the speed at which the torque is transmitted between the shafts 12 and 62 is determined by the relative spacings between the pairs of discs. The inward and outward movement of the speed governing discs 10 and 11 and 68 and 69 is controlled by a pair of elongated levers 71 and 72 each pivoted intermediate its ends on a pin 73 which extends vertically through a bifurcated link or support 74. The supports 74 are in turn pivotally connected by means of pins 76 to inwardly projecting lugs 77 on the inner side walls of the lower casing section 61.

The left ends of the levers 71 and 72, as viewed in Fig. 7, are provided with slots 78 into which extend cooperating pins 79 carried on a pair of split collars 81. The collars 81 are disposed in annular channels or grooves formed in the outwardly extending hub portions, indicated at 82 and 83, of the conical discs 10 and 11, respectively. Similarly, the levers 71 and 72 are provided with slots 84 and 86 intermediate their right end portions and their pivotal mountings at 73, and a pair of pins 87 extend into the slots 84 and 86, these pins likewise being carried on a pair of split collars 88 which are disposed in suitable annular grooves in the outwardly directed hub portions, indicated at 89 and 91, of the conical discs 68 and 69, respectively. By the foregoing construction, it will be understood that pivotal movement of the levers 71 and 72 will cause inward movement of one pair of discs toward each other and simultaneous outward movement of the other pair of discs away from each other.

For effecting pivotal movement, the levers 71 and 72 are provided with slots 92 and 93 adjacent their right ends into which are received cooperating pins 94 secured to a pair of threaded nuts 96 and 97. The nuts 96 and 97 are threadedly carried on a pair of aligned transversely extending screws 98 and 99 which are supported at their outer ends in a pair of bearing members 101 and 102 secured to the inner walls of the casing 61. A pair of bevel gears 103 and 104 are carried at the inner ends of the screws 98 and 99 for rotative movement therewith. Each of the bevel gears 103 and 104 is meshed with an intermediate bevel gear 106 carried at the lower end of a vertical stem or shaft 107. The upper end of this shaft 107 (not shown) projects beyond the casing and is provided with a calibrated hand wheel for effecting manual rotation of the shaft 107. It will be understood that by rotation of the shaft 107 and the gear 106 carried thereon, pivotal movement of the levers 71 and 72 can be readily obtained through the gears 103 and 104, the screws 98 and 99, and the nuts 96 and 97, the direction of pivotal movement of the levers 71 and 72 being determined by the direction of rotation of the shaft 107.

The construction and operation of the conical discs 68 and 69 on the shaft 62 and their associated radially movable sprocket and gear assemblies are identical to the construction hereinbefore described in connection with the discs 10 and 11.

Although there has been shown in the drawings and described above a preferred embodiment of the present invention, it is to be understood that changes and modifications may be made in the details of construction and mode of operation without departure from the spirit and scope of the appended claims.

I claim:

1. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and locking means supported on said body portion for movement relative thereto for preventing rotation of said sprockets during meshed driving engagement thereof with said chain.

2. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and locking means supported on said body portion for movement relative thereto and engageable with said rotatable member upon said movement to restrain said rotatable member against rotation for preventing rotation of said sprockets during meshed driving engagement thereof with said chain.

3. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising supporting side members, a rotatable shaft supported for rotation between said side members, a plurality of sprockets secured to and rotatable with said shaft, and locking means connected with said side members and engageable with said shaft and movable to and from locking engagement with said shaft and adapted to prevent, when in locking engagement, rotation of said shaft.

4. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and movable locking means engageable with said chain and said rotatable member and adapted to be moved by said chain into locking engagement with said rotatable member to prevent rotation thereof and said sprockets.

5. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and locking means supported on said body portion for movement relative thereto and engageable with said chain and adapted to be moved thereby into locking position for preventing rotation of said sprockets during meshed driving engagement thereof with said chain.

6. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and locking means for preventing rotation of said sprockets during meshed driving engagement thereof with said chain comprising a gear carried by and rotatable with said rotatable member and a gear rack supported on said body portion for movement relative thereto and normally spaced from said gear but engageable therewith and with said chain and adapted to be moved by said chain into meshing engagement with said gear.

7. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to be carried by said rotary members and to transmit driving force between the rotary members and the chain comprising a body portion, a rotatable member rotatably mounted on said body portion, a plurality of sprockets secured to and rotatable with said rotatable member, and locking means for preventing rotation of said sprockets during meshed driving engagement thereof with said chain comprising an engageable member carried by and rotatable with said rotatable member and a cooperating engageable member supported on said body portion and normally spaced from said first engageable member but engageable therewith and adapted to be moved into engagement with said first engageable member to prevent rotation thereof.

8. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising a body portion, a rotatable member rotatably mounted on said body portion, a plurality of sprockets secured to and rotatable with said rotatable member, and locking means for preventing rotation of said sprockets during meshed driving engagement thereof with said chain comprising an engageable member carried by and rotatable with said rotatable member and a cooperating engageable member supported on said body portion and normally spaced from said first engageable member engageable therewith and with said chain and adapted to be moved by the chain into engagement with said first engageable member to prevent rotation thereof, the teeth of said sprockets being adapted to engage the chain to complete adjusting movement of the sprockets to proper meshing position when said engageable means are in interengaged locking position.

9. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising a body portion, a rotatable member rotatably mounted on said body portion, a plurality of sprockets secured to and rotatable with said rotatable member, and locking means for preventing rotation of said sprockets during meshed driving engagement thereof with said chain comprising an engageable member carried by and rotatable with said rotatable member and a cooperating engageable member supported on said body portion and normally spaced from said first engageable member and engageable therewith and with said chain and adapted to be moved by said chain into engagement with said first engageable member to prevent rotation thereof, the teeth of said sprockets being adapted to engage the chain prior to engagement of said chain with the cooperating engageable member and to be rotated thereby to proper meshing position, and the cooperating engageable member being spaced from said first engageable member a distance sufficient to permit complete adjusting movement of the sprocket teeth upon complete interengagement of said engageable means.

10. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising supporting side members, a fixed shaft between said side members, a sleeve freely rotatable on said shaft, a plurality of sprockets secured to and rotatable with said sleeve, and locking means movably connected to said side members and engageable with said sleeve and movable to and from locking engagement with said sleeve and adapted to prevent, when in locking engagement, rotation of said sleeve.

11. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising a rotatable member, a plurality of sprockets secured to and rotatable with said said rotatable member, and locking means for preventing rotation of said sprockets during meshed driving engagement thereof with said chain comprising a gear carried by and rotatable with said rotatable member, a carriage frame slidably mounted on said rotatable member for transverse movement relative thereto and restrained against rotation therewith and adapted to be engaged by said chain and a toothed member on said frame normally spaced from said gear and adapted to be moved into locked meshing engagement with said gear, said movement to locked position being effected by engagement of said chain with said frame.

12. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising a body portion, a rotatable member rotatably mounted on said body portion, a sprocket secured to and rotatable with said rotatable member, and movable locking means supported by said body portion and engageable with said chain and the rotatable member and adapted to restrain said rotatable member against rotation and movable to said engageable restraining position by said chain.

13. In a variable speed transmission comprising rotary driving and driven shafts, rotary members mounted in spaced relation on said shafts and extending radially therefrom and an endless chain for transmitting rotary movement from the rotary members on one shaft to rotary members on the other shaft, a sprocket assembly adapted to transmit driving force between the rotary members and the chain comprising a body portion, a rotatable member rotatably mounted on said body portion, a sprocket secured to and rotatable with said rotatable member, and movable locking means supported by said body portion and engageable with said chain for preventing rotation of said sprocket during meshed driving engagement thereof with said chain and adapted to be moved to and held in locking position during engagement with said chain.

14. In a variable speed transmission comprising rotary driving and driven shafts and rotary members mounted in spaced relation on said shafts and extending radially therefrom, the combination of a plurality of endless chains, a plurality of transverse bars connected to and supporting said chains in spaced relation, and a sprocket assembly adapted to transmit driving force between the rotary members and the chains comprising a body portion, a rotatable member rotatably mounted on said body portion, a plurality of spaced sprockets secured to and rotatable with said rotatable member and movable locking means supported by said body portion and engageable with the transverse bars of said chain and adapted to be moved thereby into locking engagement for preventing rotation of the sprockets when in meshed engagement with said chains.

15. In a variable speed transmission comprising rotary driving and driven shafts and rotary members mounted in spaced relation on said shafts and extending radially therefrom, the combination of a plurality of endless chains, a plurality of transverse bars connected to and supporting said chains in spaced relation, and a sprocket assembly adapted to transmit driving force between the rotary members and the chains comprising a body portion, a rotatable member rotatably mounted on said body portion, a plurality of spaced sprockets secured to and rotatable with said rotatable member and movable locking means supported by said body portion and engageable with the transverse bars of said chain and said rotatable member and adapted to be moved by said chain bars into locking engagement with said rotatable member for preventing rotation of the sprockets when in meshed engagement with said chains.

16. In a variable speed transmission comprising rotary driving and driven shafts and rotary members mounted in spaced relation on said shafts and extending radially therefrom, the combination of a plurality of endless chains, a plurality of transverse bars connected to and supporting said chains in spaced relation, and a sprocket assembly adapted to transmit driving force between the rotary members and the chains comprising a body portion, a rotatable member rotatably mounted on said body portion, a plurality of spaced sprockets secured to and rotatable with said rotatable member and locking means for preventing rotation of said sprockets during meshed driving engagement thereof with said chains comprising a gear carried by and rotatable with said rotatable member and a movable gear rack supported by said body portion and normally spaced from said gear and engageable with said transverse chain bars and said gear and moved by said chain bars into meshing engagement with said gear.

17. In a variable speed transmission comprising rotary driving and driven shafts and rotary members mounted in spaced relation on said shafts and extending radially therefrom, the combination of a plurality of endless chains, a plurality of transverse bars connected to and supporting said chains in spaced relation, and a sprocket assembly adapted to transmit driving force between the rotary members and the chains comprising a body portion, a rotatable member rotatably mounted on said body portion, a plurality of spaced sprockets secured to and rotatable with said rotatable member and movable locking means movably supported by said body portion and engageable with the rotative member and the transverse bars of said chain and adapted to be moved by the chain into locking engagement with said rotatable member for preventing rotation of the sprockets when in meshed engagement with said chains, the teeth of the sprockets being positioned closer to the chains than the locking means is to the chain bars to permit the sprocket teeth to engage the chains prior to engagement of the transverse chain bars with the locking means and to be rotated thereby into proper meshing position, and the locking means being spaced from the rotatable member a distance sufficient to permit complete adjusting movement of the sprocket teeth upon complete movement of said locking means into locking position with said rotatable member.

GEOFFREY M. HARRY.

REFERENCES CITED

The following references are of record in the file of this patent:

UNITED STATES PATENTS

| Number | Name | Date |
|---|---|---|
| 724,450 | Dumaresq | Apr. 7, 1903 |
| 1,650,449 | Jaeger | Nov. 22, 1927 |
| 1,921,197 | Larson et al. | Aug. 8, 1933 |
| 2,341,076 | Booth | Feb. 8, 1944 |